United States Patent Office 3,327,076
Patented June 20, 1967

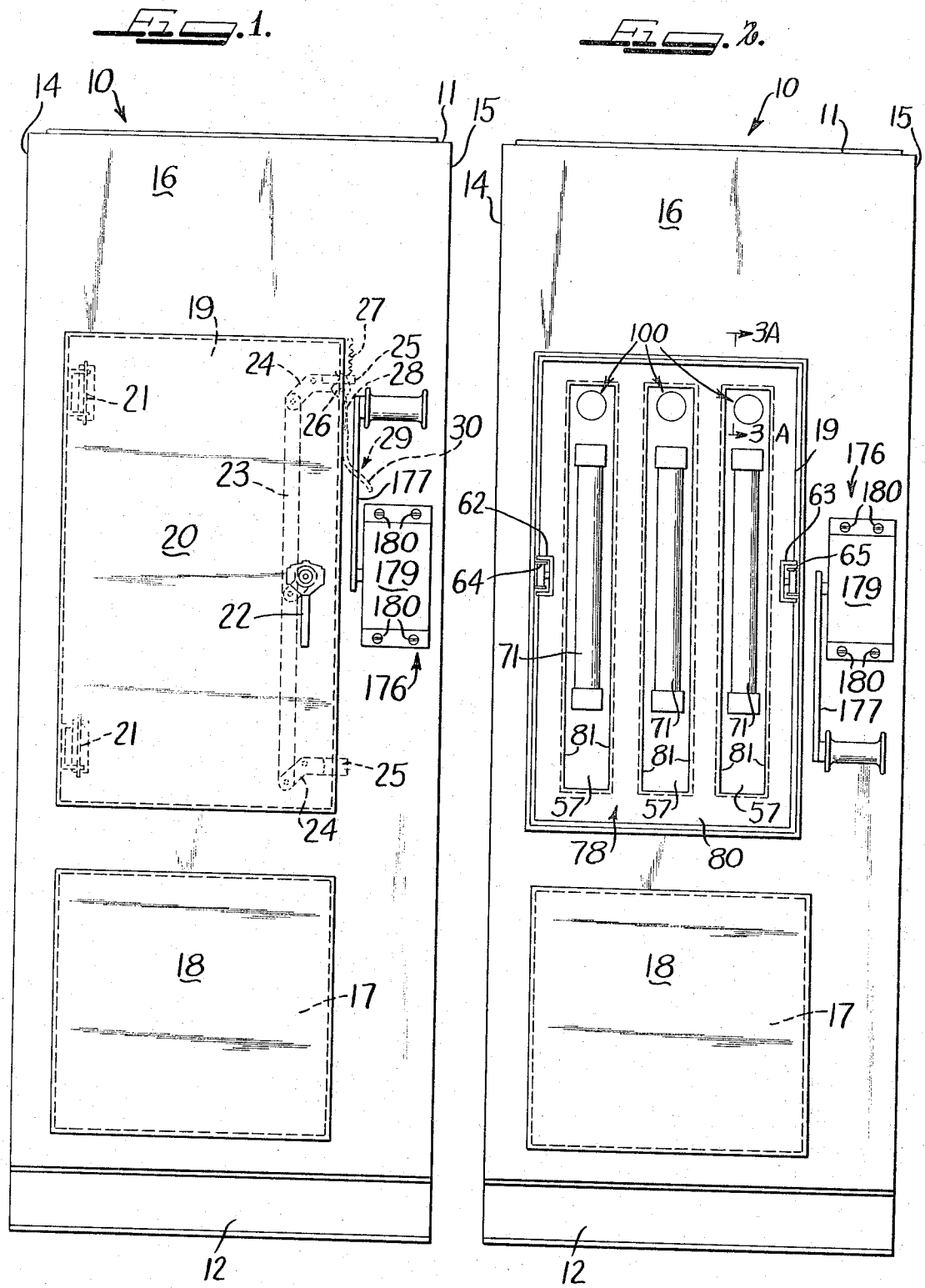

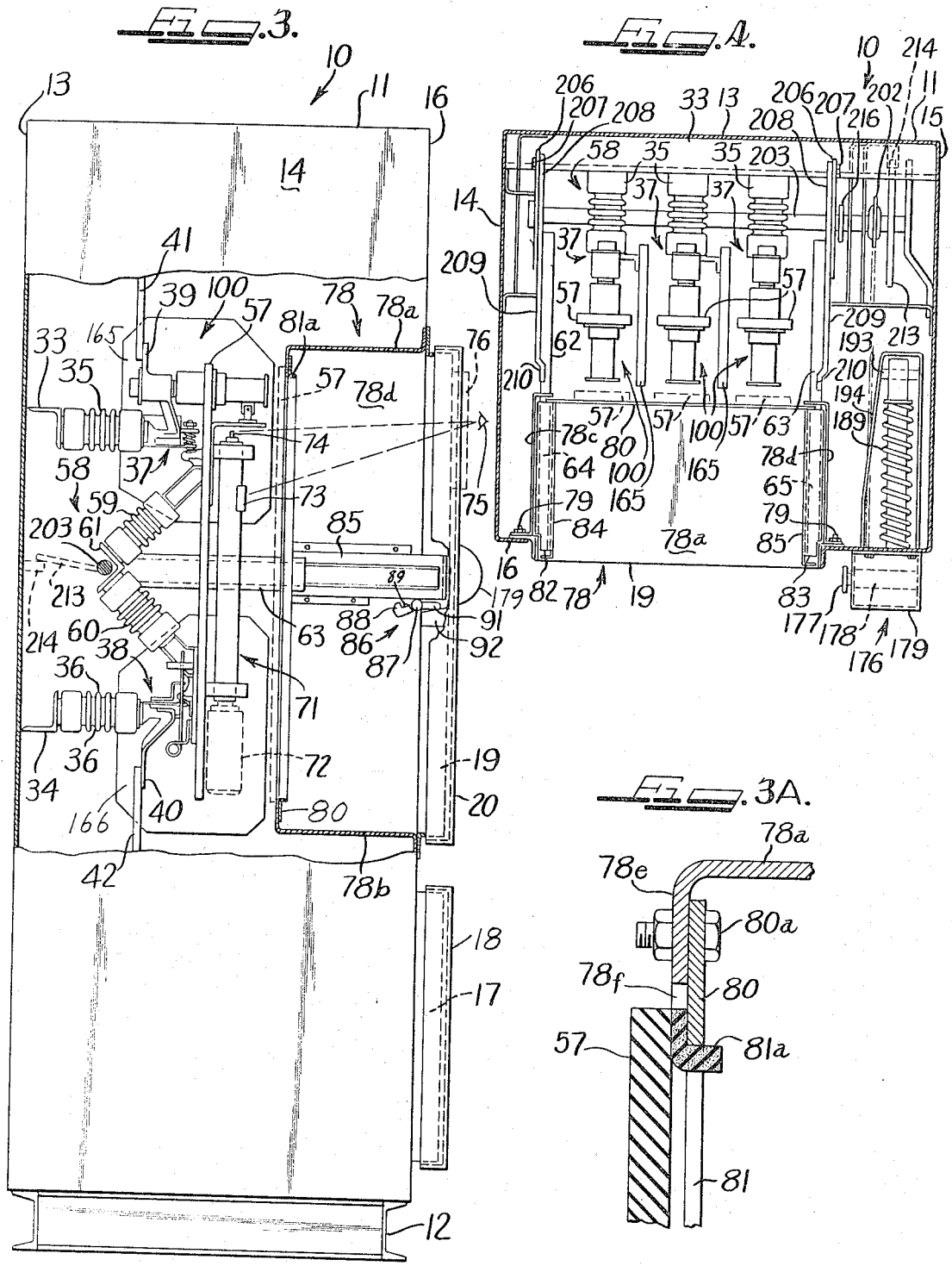

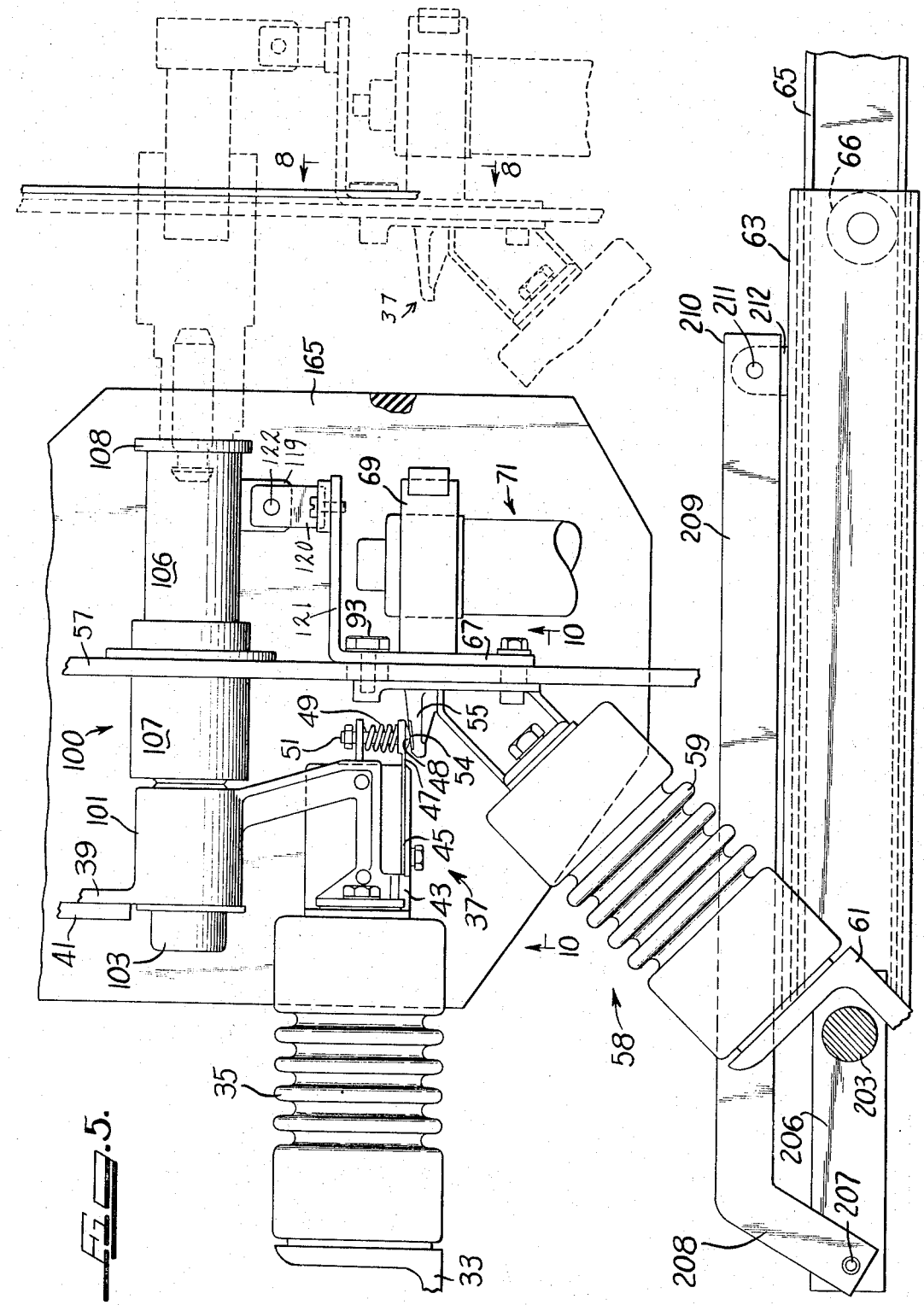

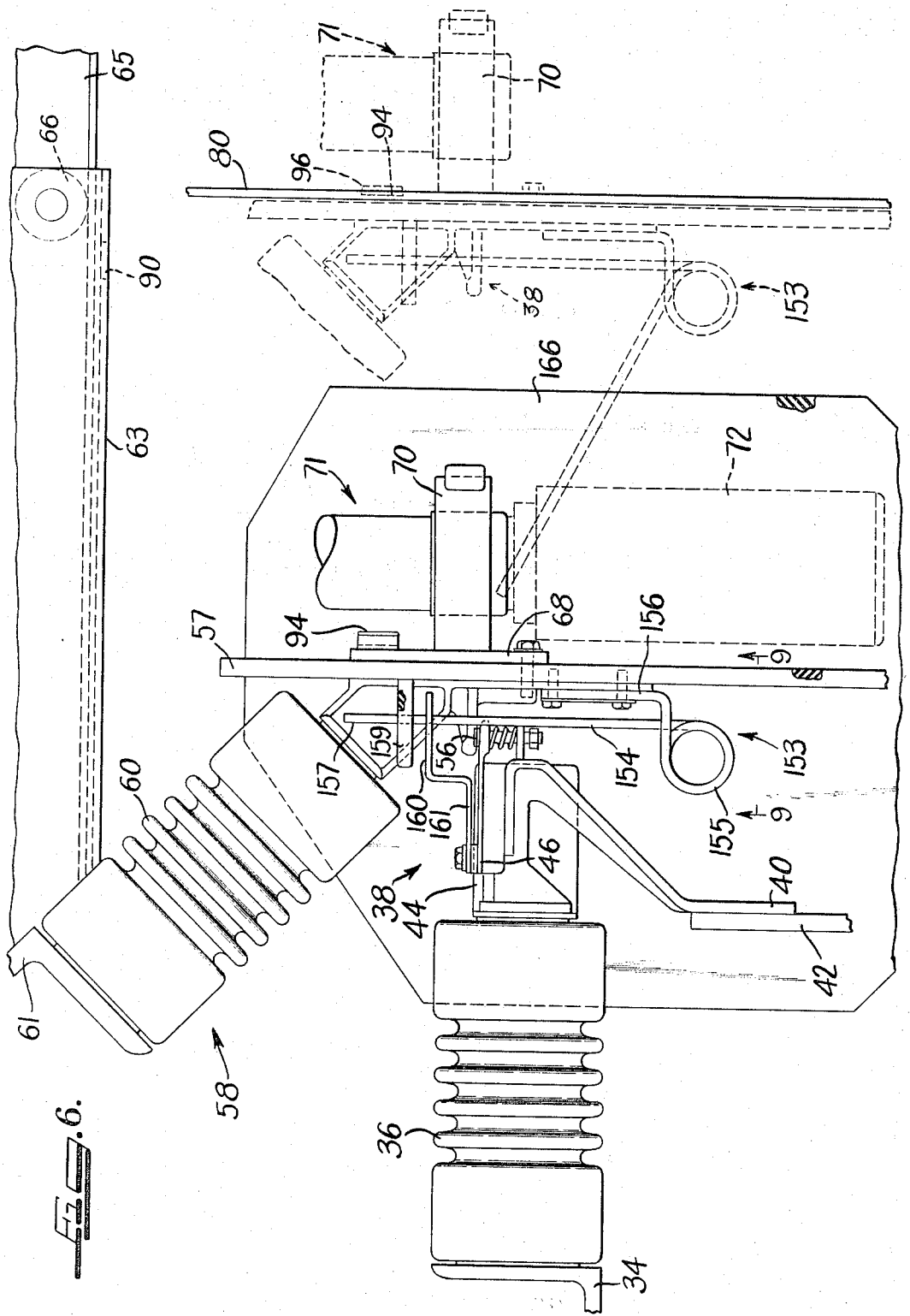

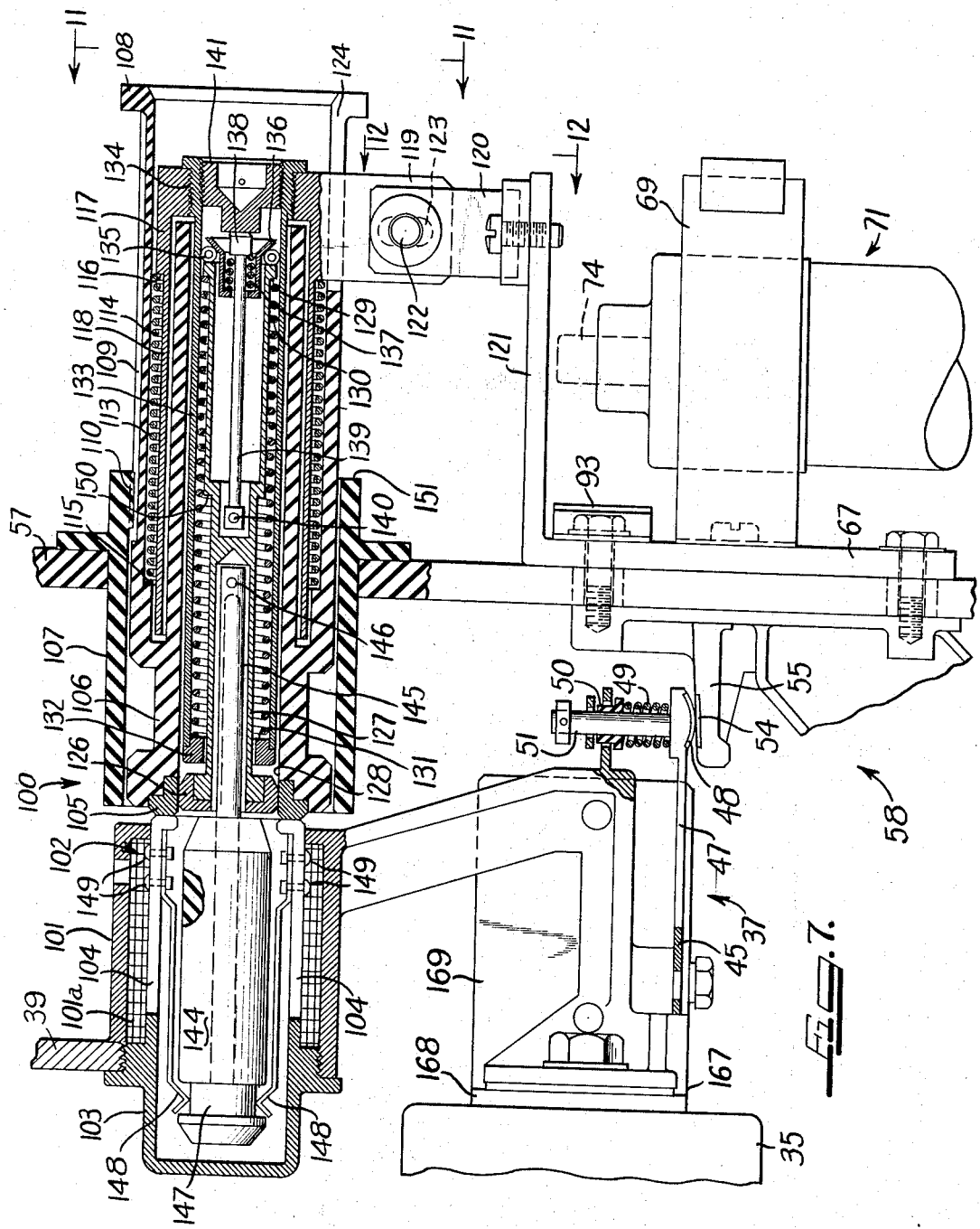

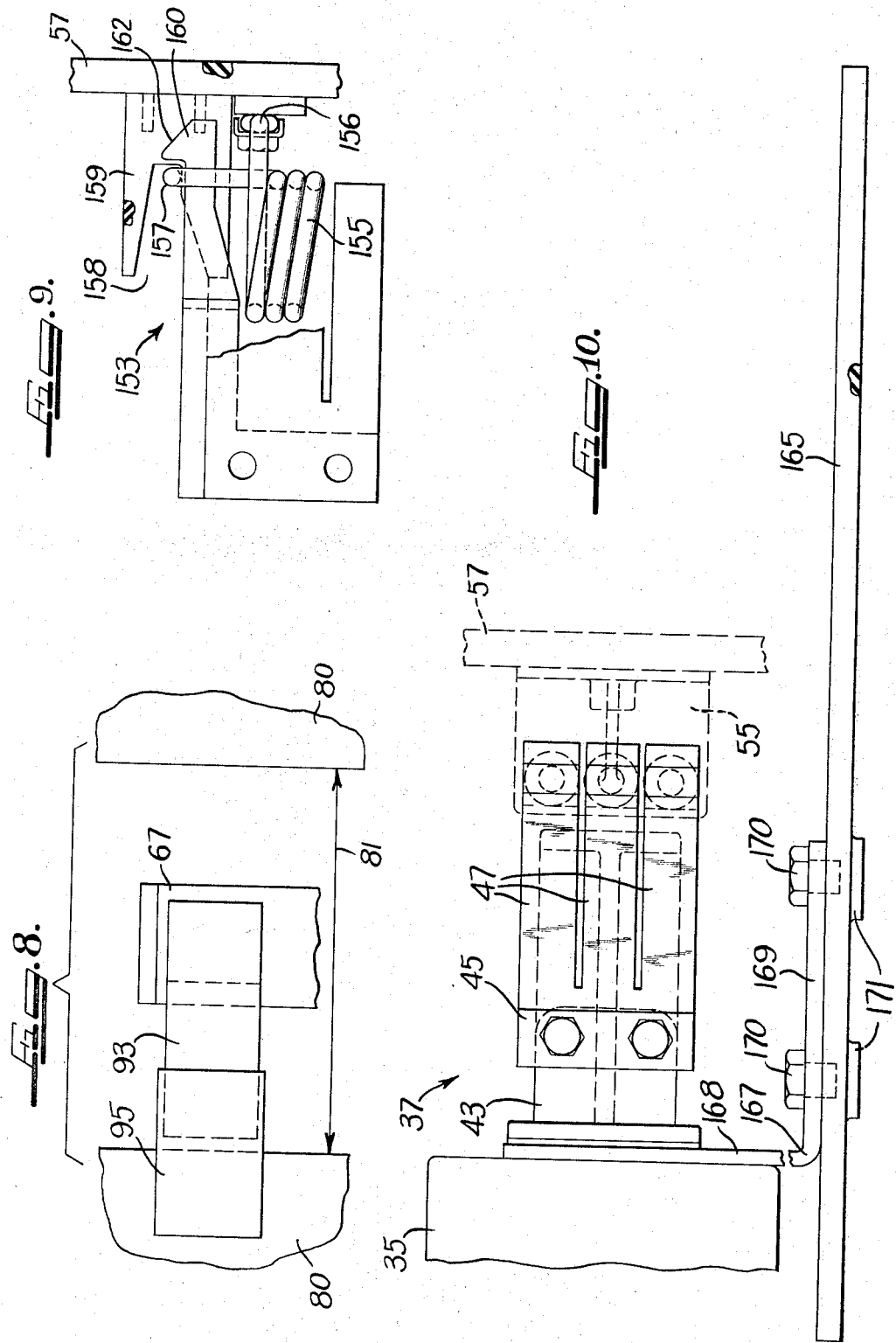

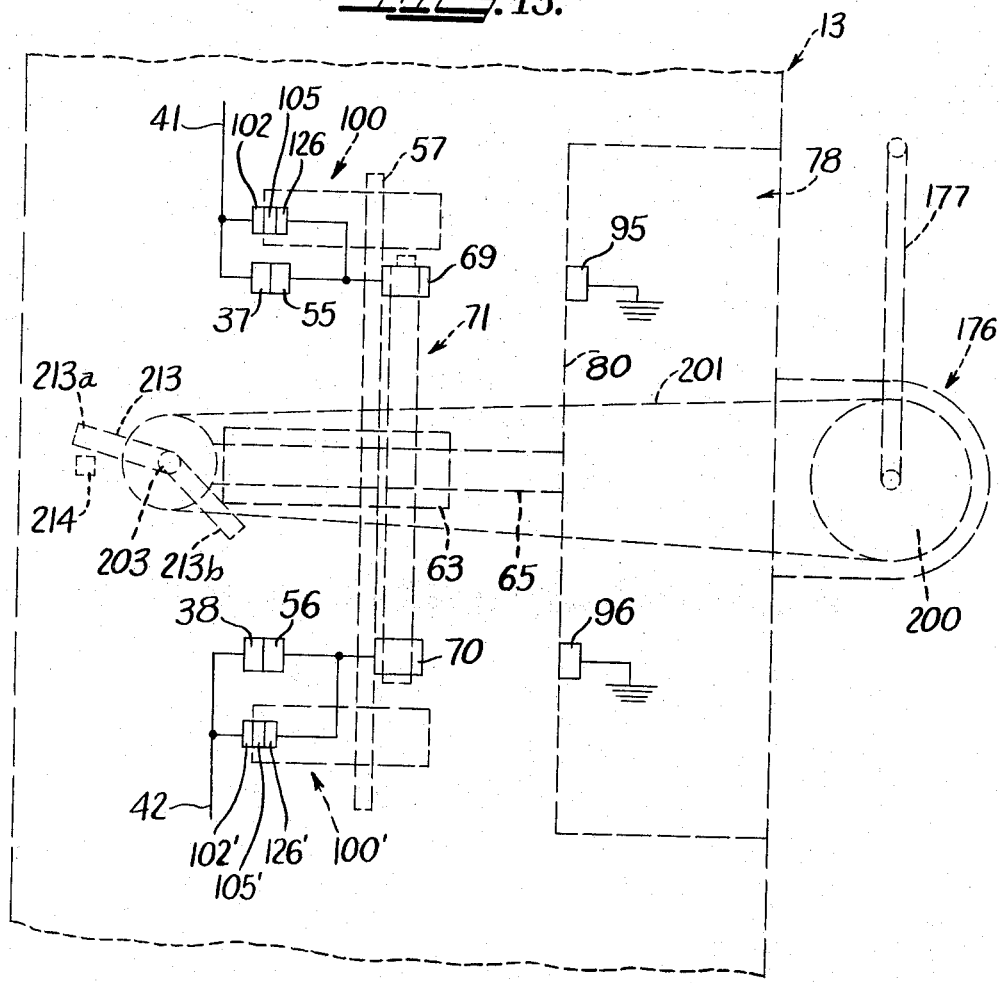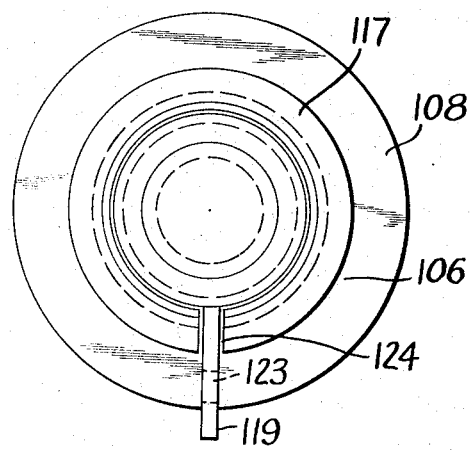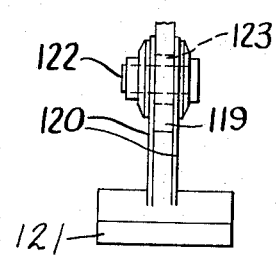

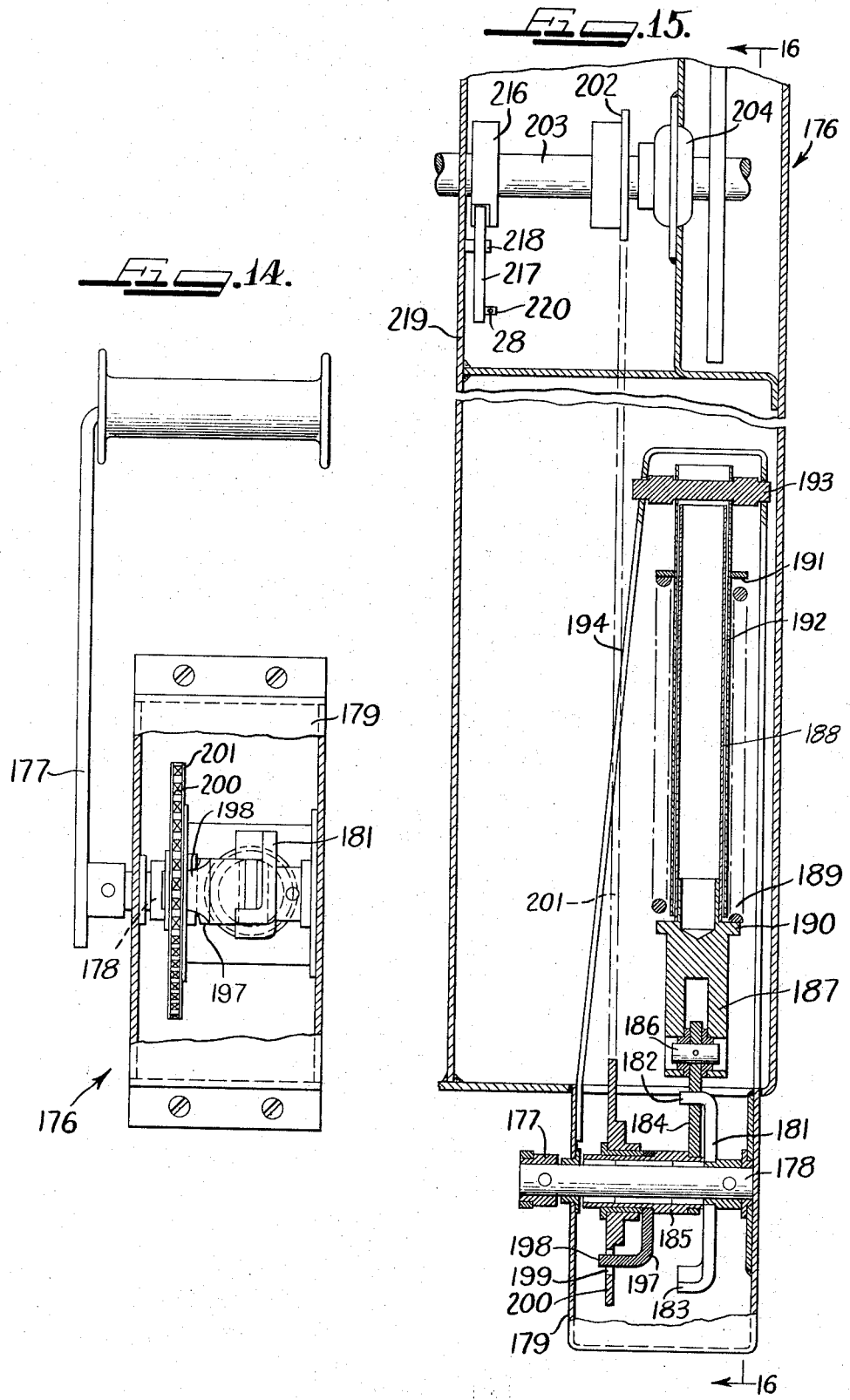

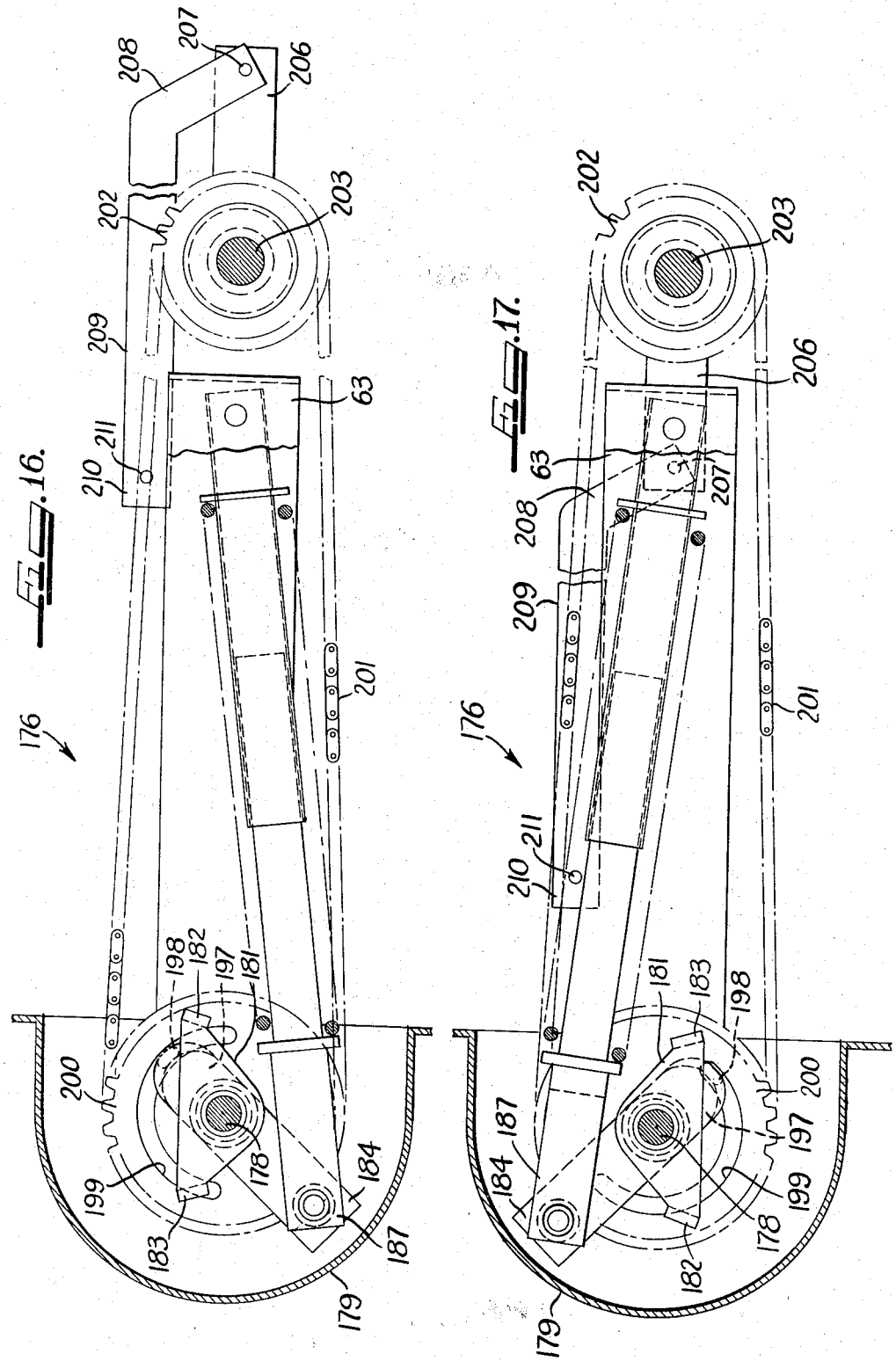

3,327,076
METALCLAD SWITCHGEAR HAVING RECIPROCATING CARRIAGE CARRYING ONE OR MORE FUSES AND LOAD INTERRUPTERS
Sigurd I. Lindell, Northbrook, Ill., assignor to S & C Electric Company, Chicago, Ill., a corporation of Delaware
Filed May 23, 1966, Ser. No. 552,282
32 Claims. (Cl. 200—50)

ABSTRACT OF THE DISCLOSURE

High voltage metal enclosed switchgear has a metallic safety compartment spaced from insulated line contacts with a carriage mounted for translatory movement therebetween. An insulating slab is movable with the carriage and has carriage contacts on one side for engaging the line contacts and fuses on the other side interconnecting the carriage contacts. Operating means move the carriage to disengage the contacts and position the fuses in the metallic safety compartment where they can be serviced without danger to the operator. A separable contact circuit interrupter, provided with stationary, intermediate and movable contacts, shunts associated line and carriage contacts for opening the circuit therebetween after they are separated by the operating means.

---

This invention relates, generally, to metalclad switchgear for use with electric circuits operating at voltages of the order of 13.2 kv., although it may be employed with suitable modification on circuits operating at higher or lower voltages. It constitutes an improvement over the metalclad switchgear disclosed in U.S. Beebe et al. 3,055,996, issued Sept. 25, 1962.

Among the objects of this invention are: To provide a compact metalclad switching assembly in which one or more fuses are carried by a switching member that is arranged to disconnect both terminals of each fuse from corresponding line terminals with the circuit interruption being accomplished by a load current interrupting unit bodily movable with each fuse; to construct the switching assembly in such manner that routine servicing thereof, such as changing or replacing blown fuses, can be accomplished with complete safety by a relatively unskilled operator; to arrange for complete servicing of the switching assembly by experienced and qualified service personnel; to arrange for moving the switching assembly from its connected position in a metallic housing to a disconnected position where the fuse or fuses and interrupting unit or units are located in a metallic safety compartment from which no energized parts are accessible; to close off the safety compartment by a door that can be opened only when the switching assembly occupies the disconnected position; to operate the switching assembly from and to its connected position by an overcenter spring mechanism that is arranged to hold it in either the connected or the disconnected position; to interlock the overcenter spring mechanism and the door in such manner that the spring mechanism can be operated only when the door is closed; to interlock the switching assembly and the metallic housing to prevent movement of the switching assembly toward the connected position when the door is open; when a polyphase switching assembly is used with corresponding line terminals and interphase barriers, to mount each interphase barrier on an adjacent line terminal to prevent flow of charging current to ground and resulting tracking over its surface; to provide in metalclad switchgear for disconnecting and moving the switching assembly into a compartment where access can be had to replace the fuses and inspect the load current interrupting units under cover and not directly exposed to the weather; to arrange for a visual inspection of the fuses and load current interrupting units without requiring opening of the door to the metallic housing; to provide two current interrupting gaps in series by employing a load current interrupting unit in shunt with each line contact and the associated contact on the switching assembly; to construct each load current interrupting unit in such manner that it can be removed bodily from the switching assembly without disturbing the line terminal connection thereto; to employ an intermediate contact for the load current interrupting unit between which and a contact movable into the unit an arc is drawn and extinguished with spring means being arranged to bias the unit toward a stationary line contact and thereby maintain connection thereto during the initial portion of the movement of the switching assembly away from the line contacts; to arrange for the snap acting spring operating overcenter mechanism that moves the switching assembly toward and from the line contacts to work against the spring means that biases the intermediate contact into engagement with the associated line contact when the switching assembly is moved toward the line contacts whereby the spring means functions also as shock absorbing means, said spring means acting to aid the snap acting overcenter operating mechanism in moving the switching assembly away from the line terminals and operating the interrupting means to interrupt the load current after separation of the associated main contacts.

The present invention includes switchgear which comprises a metallic housing with a pair of line contacts mounted in insulated spaced relation therein, a metallic safety compartment in the housing having an apertured wall opposite the line contacts, a carriage mounted for translatory movement in the housing between the line contacts and the compartment and having a pair of carriage contacts thereon for engagement with and disengagement from the line contacts, the carriage contacts being mounted on an insulating slab positioned on the carriage with contact clips on the opposite side arranged to project through the aperture in the wall of the safety compartment and to be interconnected by conductor means, such as a connecting blade or fuse device, and means on the housing for moving the carriage to separate the carriage contacts from the line contacts and to move the contact clips and the conductor means through the aperture into the compartment and vice versa. The invention further includes separable contact circuit interrupter means mounted on and movable with the slab and arranged to shunt either one line contact and the associated carriage contact or both line contacts and the associated carriage contacts to provide one or two gaps in the circuit after the carriage contacts have been separated from the line contacts to interrupt the flow of current. Interlocking means are provided between the metallic housing and the carriage to prevent movement of the carriage when the door to the housing is open. Additional interlocking means are provided for preventing opening of the door, unless the carriage is moved to a position where the carriage contacts are disconnected from the line contacts. When a polyphase installation is employed, insulating barriers are provided between the several phases with each insulating interphase barrier being mounted on an adjacent line terminal to avoid flow of leakage current over the barrier to ground which would cause tracking. A window is provided in the door which permits a visual inspection of the fuses and current interrupting unit without requiring that the door be opened. Provision is made for connecting the carriage contacts and parts directly connected thereto to ground when the carriage has been moved into the metallic safety compartment. Each circuit interrupting unit is provided with an intermediate contact that is spring biased into engagement with a stationary line contact and has associated therewith a movable contact with the arc being drawn and extinguished between the movable contact and the intermediate contact followed by separation of the intermediate contact from the line contact on bodily movement of the switching assembly or carriage a predetermined distance away from the line contacts.

It the drawings: FIG. 1 is a view, in front elevation, of metalclad switchgear embodying this invention. FIG. 2 is a view, similar to FIG. 1, with certain parts including the door having been omitted to show certain of the interior details of construction. FIG. 3 in a view, in side elevation, of the metalclad switch gear shown in FIG. 1, a part of the side wall having been broken away to show certain of the interior details of construction. FIG. 3A is a sectional view, at an enlarged scale, taken generally along line 3A—3A of FIG. 2. FIG. 4 is a top plan view of the metalclad switchgear shown in the preceding figures. FIGS. 5 and 6 with the former being placed above the latter show, at an enlarged scale, certain details of construction of one pole of the metalclad switchgear, the construction being shown in the switch closed position. FIG. 7 is a vertical sectional view, at an enlarged scale, of the separable contact circuit interrupter shown in FIG. 5 together with the associated upper stationary line contact and its carriage contact. FIG. 8 is a view, at an enlarged scale, taken generally along the line 8—8 of FIG. 5. FIG. 9 is a horizontal sectional view, at an enlarged scale, taken generally along the line 9—9 of FIG. 6. FIG. 10 is a horizontal sectional view, at an enlarged scale, taken generally along line 10—10 of FIG. 5. FIG. 11 is a view, at an enlarged scale, taken generally along the line 11—11 of FIG. 7. FIG. 12 is an end view taken generally along the line 12—12 of FIG. 7. FIG. 13 illustrates diagrammatically the circuit connections that can be employed in practicing this invention and also shows an alternate arrangement employing two separable contact circuit interrupters in series. FIG. 14 is a view, in front elevation, of the snap acting operating mechanism, a part of the housing being broken away in order to show certain internal details of construction. FIG. 15 is a top plan view, at an enlarged scale, with certain parts being shown in section of the snap acting operating mechanism. FIG. 16 is a vertical sectional view taken generally along the line 16—16 of FIG. 15 and shows the snap acting operating mechanism in the position that it occupies when the carriage is in the circuit closed position. FIG. 17 is a view, similar to FIG. 16, but showing the position of the snap acting operating mechanism when the carriage occupies the circuit open position.

Referring now to FIGS. 1, 2, 3 and 4, the reference character 10 designates, generally metalclad switchgear switchgear embodying this invention. While, as pointed out above, the metaclad switchgear 10 is intended for operation at a voltage of the order of 13.2 kv., it can be employed, with suitable modification, for operation on alternating current circuits energized at higher or lower voltages. The metalclad switchgear 10 employs a metallic housing 11 that is open at the top and bottom and is arranged to be mounted on a support frame 12. The metallic housing 11 includes a rear wall 13, side walls 14 and 15 and a front wall 16. The front wall 16 is provided with a lower opening 17 through which access can be had to circuit conductors extending upwardly through the support frame 12. A cover 18 overlies the lower opening 17 and preferably is arranged so that it can be detached only by an experienced operator and from the inside of the housing 11.

Above the lower opening 11 there is a door opening 19 that is arranged to be closed by a door 20 which is hinged at 21. The door 20 can be latched in the closed position using the latch mechanism described in the above patent. The latch mechanism includes a door handle 22 that is arranged to reciprocate a latch bar 23 for rotating movable latch members 24 that engage fixed latch members 25 which are attached to the inner side of the front wall 16. Arranged for operation with the upper latch member 24 is a pawl 26 that is biased by a spring 27 and is arranged to be controlled by a flexible wire 28 which forms a part of a control cable 29 which includes a stationary sleeve 30 as described in the patent above referred to.

The other end of the flexible wire 28 is arranged, as described hereinafter, to operate a locking lever or to be operated by a locking lever for preventing operation of the door handle 22 and opening of the door 20 except when the switchgear within the metallic housing 11 occupies the open circuit position. This and other precautions are taken in the construction of the metalclad switchgear 10 in view of the fact that it may be operated by unskilled or inexperienced personnel who are permitted only to open and close the circuit and to replace fuses, to be described, in the event that they blow.

As shown in FIG. 3, upper and lower angle supports 33 and 34 extend between the side walls 14 and 15 of the metallic housing 11 and adjacent its rear wall 13. They are arranged to support forwardly extending upper and lower insulators 35 and 36. Where single phase operation only is employed, only one pair of upper and lower insulators 35 and 36 is provided. However, as shown in FIG. 4, where a polyphase system is employed there may be three pairs of upper and lower insulators 35 and 36. Since the construction of the apparatus associated with each of the phases is the same, a description of one will suffice for all.

Upper and lower stationary line contacts 37 and 38 are mounted on forward ends of the upper and lower insulators 35 and 36. They are provided with upper and lower contact pads 39 and 40 to which upper and lower conductors 41 and 42 can be connected. The line conductors 41 and 42 are shown in the form of flat bus bars. They may be cables with suitable terminal lugs, if desired. As shown more clearly in FIGS. 5, 6 and 10 the upper and lower stationary line terminals 37 and 38 are provided with upper and lower contact support flanges 43 and 44 to which upper and lower contact plates 45 and 46 are secured. The arrangement of the contact plates 45 and 46 with the associated portions of the stationary line contacts 37 and 38 is such as to provide a hairpin construction in order to take advantage of the forces that are generated on flow of heavy current, particularly short circuit current, for maintaining contact engagement with movable contacts to be described. As shown more clearly in FIG. 10 each contact plate, such as the contact plate 45, has contact fingers 47 formed integrally therewith. For example, three contact fingers 47 are provided and each of them has a silver insert 48, FIG. 7. The distal ends of the contact fingers 47 are urged downwardly by coil compression springs one of which is shown at 49, FIG. 7. The spring 49 reacts between the upper side of the respective contact finger 47 and the underside of an insulating bushing 50 that is mounted on the respective stationary line contact. A guide rod 51 extends through the insulating bushing 50 to maintain the spring 49 in proper position.

The contact fingers 47 extending from the upper and lower contact plates 45 and 46 are arranged to engage silver inserts 54 in upper and lower carriage contacts that are indicated at 55 and 56 in FIGS. 5, 6 and 7. The upper carriage contacts 55 face upwardly while lower carriage contacts 56 face downwardly. The carriage contacts 55 and 56 are carried in insulated spaced relation by an insulating slab 57. Where the polyphase operation is employed, three slabs 57 are used. The insulating slabs 57 are mounted on a carriage, shown generally at 58, that is supported for horizontal translatory movement within the metallic housing 11 and away from and toward the stationary line contacts 37 and 38 for opening and closing the circuit therebetween in a manner to be described.

The carriage 58 includes upper and lower insulators 59 and 60, FIGS. 3, 5 and 6, which are mounted in 90° angular relationship on the flanges of a transverse angle 61 which is welded at its ends to channels 62 and 63 that are guided for horizontal translatory movement along stationary channels 64 and 65 that are suitably secured to the metallic housing 11 and guide the carriage 58 in its translatory movement away from and toward the stationary line contacts 37 and 38. Rollers, one shown at 66 in FIGS. 5 and 6, are employed for facilitating the movement of the channels 62 and 63 along the stationary channels 64 and 65.

On the front side of each insulating slab 57, as shown in FIGS. 5 and 6, upper and lower contact plates 67 and 68 are positioned and are suitably connected to the upper and lower carriage contacts 55 and 56 mounted on the rear side. Upper and lower contact clips 69 and 70 project forwardly from the contact plates 67 and 68. The contact clips 69 and 70 are arranged to be connected by suitable conducting means such as a solid copper bar or, as indicated at 71, by a solid material fuse of conventional type. When a solid material fuse is employed a condenser, indicated by broken lines at 72 in FIGS. 3 and 6, can be provided. Alternatively, the conducting means 71 can be in the form of a current limiting fuse.

It is desirable that means be provided for indicating whether or not the conducting means 71, if in the form of a fuse, has blown. For this purpose a magnetic indicator 73 can be employed and constructed and arranged as disclosed in copending Lindell application Serial No. 509,368, filed November 23, 1965. Alternatively, if the conducting means 71 is a current limiting fuse, then a movable indicator pin 74 can be employed as described in copending Lindell application Serial No. 522,676, filed January 24, 1966. One or the other of the indicators 73 or 74 can be viewed by the eye 75 of the operator positioned in front of a window 76 that may be provided in the door 20. This inspection can take place with the carriage 58 in the circuit closed position. Thus it is possible for the operator, without having to move the carriage 58 to open circuit position or to open the door 20, to determine the condition of any of the fuses, if such are employed for the conducting means 71.

In the event that it becomes necessary for the relatively unskilled operator to replace a blown fuse or to remove and inspect separable contact circuit interrupter means to be described, it is essential that provision be made for his complete safety in performing these functions. For this purpose there is employed a metallic safety compartment that is indicated, generally, at 78 in FIGS. 2, 3 and 4. The metallic safety compartment 78 is arranged to be secured to the front wall 16 of the metallic housing 11 by bolts 79 to which access can be had only from the interior of the metallic housing 11. Thus the metallic safety compartment 78 can be removed only by experienced personnel using special equipment. The metallic safety compartment 78 is provided with upper and lower walls 78a and 78b at the top and bottom and side walls 78c and 78d. The stationary channels 64 and 65 are welded to the inner sides of the side walls 78c and 78d. The rear wall 78e, FIG. 3A, of metallic safety compartment 78 is provided with a rectangular opening 78f which is of such dimensions as to permit bodily application and removal of the carriage 58 to and from the metallic housing 11. A plate 80 overlies the opening 78f and is secured to the rear wall 78e by bolts, one of which is shown at 80a. The bolts 80 are arranged to be accessible only from the interior of the metallic housing 11 by experienced personnel. Thus the plate 80 is not intended to be removed by the inexperienced operator who may have access to the interior of the metallic safety compartment 78 for changing the fuses, inspection, etc.

The plate 80 has vertical slots 81 as shown more clearly in FIGS. 2 and 8 of the drawings. The width of each of the vertical slots 81 is slightly less than the width of the respective slab 57 so that, when the carriage 58 is moved to the open circuit position, the insulating slabs 57 are moved to the position shown by broken lines in FIG. 4 where they overlie the vertical slots 81 and thus effectively prevent any possibility of the operator coming in contact with any energized part within the metallic housing 11 or poking a conductor into the area where energized parts are located. A resilient gasket 81a, FIG. 3A, surrounds each opening 81 and serves to cushion the respective slab 57 at the end of its forward movement.

In order to enclose the stationary channels 64 and 65 and particularly the outer ends 82 and 83 thereof so as to preclude the possibility of a conductor being poked therethrough into the rear of the metallic safety compartment 78 metallic covers 84 and 85 are secured to the inner sides of the side walls 78c and 78d. The metallic covers 84 and 85 are secured in such manner that they cannot be dismounted from the exterior of the metallic safety compartment 78. Instead, only an experienced operator can remove them from the interior of the metallic housing 11 and then only with special equipment.

When the door 20 has been opened and the carriage 58 has been moved to the forward position where the conducting means 71 project through the slots 81 and are readily accessible to the unskilled operator, it is desirable that provision be made to prevent inward movement of the carriage 58. For this purpose a latch lever 86, FIG. 3, is pivoted at 87 on the side wall 78d of the metallic safety compartment 78. A hooked end 88 is arranged to be biased by a spring 89 to engage a slot 90, FIG. 6, in the underside of the adjacent channel 63 when it occupies the forward position. In order to release the latch lever 86 and move the hook end 88 out of engagement with the slot 90, the other end 91 of the latch lever 86 is arranged to be engaged by a cam member 92, FIG. 3, carried by the door 20. Only when the door 20 is closed is the latch lever 86 operated to the unlatched position where the carriage 58 can be moved to the circuit closed position.

In keeping with the safety features of the present invention, it is desirable that any parts be grounded with which the unskilled operator can come into contact when the door 20 is opened. For this purpose upper and lower flexible ground conductors 93 and 94 are employed as shown in FIGS. 5 and 6. They are connected to the upper and lower contact plates 67 and 68. The upper flexible ground conductor 93 is shown in more detail in FIG. 8. When the carriage 58 is moved to the forward position with the conducting means 71 extending through the vertical slots 81 and into the metallic safety compartment 78, the flexible ground conductors 93 and 94 come into contact with ground connections 95 and 96 which are securely connected to the rear wall 80. The arrangement of the upper ground connection 95 is shown more clearly in FIG. 8. Since the upper and lower carriage contacts 55 and 56 are grounded in the open position of the carriage 58, the arrangement and spacing of the conducting parts are such that full line to ground insulation is provided between each of the upper and lower stationary line contacts 37 and 38 and ground.

For circuit switching purposes with current flowing between the upper and lower line conductors 41 and 42, it may become necessary to disengage the upper and lower carriage contacts 55 and 56 from the upper and lower stationary line contacts 37 and 38. When such switching operations occur, it is undesirable that any arc be drawn between these contacts. Accordingly, provision is made for shunting them or at least one pair of them so that, before they separate, the current flow is transferred to another path with the result that final circuit interruption takes place other than between the carriage contacts 55 and 56 and the respective stationary line contacts 37 and 38.

For this purpose the upper stationary line contact 37 and its associated carriage contact 55 are arranged to be shunted by a separable contact interrupter that is indicated, generally, at 100. As will appear hereinafter, auxiliary contact means are provided for shunting the lower stationary line contact 38 and its associated carriage contact 56 while the carriage 58 is being moved forwardly and the circuit is being interrupted by the separable contact interrupter 100. Alternatively, as described hereinafter, a separable contact interrupter can be employed in conjunction with each lower stationary line contact 38 and its associated carriage contact 56.

FIG. 7 shows the details of construction of the separable contact 100. Here it will be observed that a metallic sleeve 101 is an integral part of the upper stationary line contact 37 and contains an annular wire screen 101a for cooling and condensing arc products. The sleeve 101 is arranged to carry and have connected thereto a stationary contact 102. The stationary contact 102 is in the form of a hollow metallic plug 103 that is threaded into the left end of the metallic sleeve 101. The inner end of the hollow plug 103 is longitudinally slotted to provide contact fingers 104 the distal ends of which are arranged to have butt contact engagement with an intermediate contact 105. The reason for this construction is to permit the separation of a portion of the separable contact interrupter 100 from the remaining portion when the carriage 58 is moved away from the stationary line contacts 37 and 38. The contact 105 is located at one end of a tubular insulating housing 106 that is slidably mounted in an insulating sleeve 107 which is carried by the insulating slab 57 and is secured thereto. At its other end the tubular housing 106 has an annular shoulder 108 that is arranged to be engaged by the right end of the insulating sleeve 107 as will be described for operating the separable contact interrupter 100. Thus the insulating sleeve 107 forms a part of the operating means for the separable contact interrupter 100. In order to maintain the tubular insulating housing 106 in aligned relation with the insulating sleeve 107, a keyway 109 is formed in the tubular insulating housing 106 and it is arranged to cooperate with a key section 110 that extends radially inwardly from the right end of the insulating sleeve 107.

During the initial movement of the carriage 58 and thereby of the slab 57 toward the metallic safety compartment 78 for opening the circuit between the upper and lower line conductors 41 and 42, it is desirable that the intermediate contact 105 remain in contact engagement with the distal ends of the contact fingers 104 which form the stationary contact 102. For this purpose a coil compression spring 113 is located in an annular slot 114 that extends from the right end of the tubular insulating housing 106. The coil compression spring 113 reacts between a shoulder 115 on the tubular insulating housing 106 and a shoulder 116 that is carried by a cylindrical metallic operating member 117 which is slidable endwise within the tubular insulating housing 106 in the annular slot 114. The coil compression spring 113 is guided by a tubular extension 118 from the cylindrical metallic operating member 117. Formed integrally with the cylindrical metallic operating member 117 is a tongue 119 that depends therefrom and, as shown more clearly in FIG. 12, is arranged to be positioned between upstanding jaws 120 that are carried by a plate extension 121 from the upper contact plate 67. A transverse pin 122 extends through the upstanding jaws 120 and through a slotted opening 123 in the depending tongue 119. This construction provides some flexibility in the mounting and operation of the cylindrical metallic operating member 117 and for maintaining proper alignment thereof with the remaining parts of the separable contact interrupter 100 while the carriage 58 is moved away from and toward the stationary line contacts 37 and 38. A slot 124 is provided in the right end of the tubular insulating housing 106 for receiving the depending tongue 119.

The circuit is arranged to be opened when a movable contact 126 separates from the intermediate contact 105 while it remains in contact engagement with the stationary contact 102. The movable contact 126 is carried by the left end of a hollow metallic contact stem 127 and is arranged to be moved into the bore 128 of the tubular insulating housing 106 for circuit interrupting purposes. However, the movable contact 126 remains in contact engagement with the intermediate contact 105 while the carriage 58 and the slab 57 mounted thereon move during the initial part of the total movement toward the opening circuit position. This permits the carriage contacts 55 and 56 to separate from the stationary line contacts 37 and 38 and to transfer the current flow to the separable contact interrupter 100 associated with the contacts 37 and 55 and the auxiliary contact means associated with the contacts 38 and 56.

At its right end the hollow metallic contact stem 127 has a radially extending shoulder 129 against which one end of a coil compression spring 130 reacts. The other end of the spring 130 reacts against a shoulder 131 on an annular fitting 132 that is carried by the left end of a metallic sleeve 133, the right end of which is threaded at 134 into the cylindrical metallic operating member 117 and thus it forms a part thereof. Contact engagement between the hollow metallic contact stem 127 carrying the movable contact 126 and the metallic sleeve 133 and thereby with the metallic operating member 117 is maintained by a garter spring 135 that reacts between the right end of the hollow metallic contact stem 127 and the inner surface of the metallic sleeve 133. The garter spring 135 is maintained in these engagements by a conical fitting 136 and a coil compression spring 137 which reacts between the fitting 136 and a head 138 at the right end of a rod 139 which is pivoted at 140 to the hollow metallic contact stem 127. This flexibility is desirable in order to provide for limited misalignment of the parts. A metallic plug 141 is threaded into the right end of the metallic operating member 117 and bears against the head 138 to hold it in proper position.

When the contact 126 moves into the bore 128, as will be described presently, to interrupt the circuit, an arc is drawn between it and the intermediate contact 105 which remains in butt contact engagement with the distal ends of the contact fingers 104 of the stationary contact 102. The arc thus drawn is confined between the inner surface of the bore 128 and the outer surface of a trailer 144 of suitable insulating material that is mounted on a stem 145 which is pivoted at 146 on the hollow metallic contact stem 127. Preferably, the tubular insulating housing 106 or at least that portion forming the bore 128 thereof and the outer surface of the trailer 144 are formed of material from which an arc extinguishing medium is evolved due to the heat of the arc. This in combination with the confinement of the arc between the bore 128 and the outer surface of the trailer 144 effectively extinguishes any arc that is drawn between the intermediate contact 105 and the movable contact 126.

The movable contact 126 is restrained against movement during the initial portion of the movement of the carriage 58 and of the slab 57 toward the open circuit position. This restraint is effected through the provision of a peripheral groove 147 in the left end of the trailer 144, FIG. 7, with which latch means in the form of friction latch fingers 148 cooperate. The latch fingers 148 are secured by rivets 149 to the contact fingers 104 adjacent their distal ends. The arrangement is such that the application of a substantial endwise force to the hollow metallic contact stem 127 is required for overcoming the friction latch force applied by the latch fingers 148. This force is provided when the annular fitting 132 which moves conjointly with the metallic sleeve 133 and the cylindrical metallic operating member 117 has the shoulder 131 brought into engagement with a shoulder 150 on the hollow contact stem 127. This engagement takes place only after there has been a substantial air gap provided between the contact fingers 47 on the upper stationary line contact 37 and the upper carriage contact 55. As the carriage 58 continues to move toward the open circuit position and the shoulder 131 engages the shoulder 150, the friction force applied by the latch fingers 148 in the peripheral groove 147 is overcome. In the meantime, the spring 130 has been compressed since the shoulder 129 against which one end of it reacts has remained stationary while the shoulder 131 has been moving to the right until it engages the shoulder 150 as described. Accordingly, the spring 130 no longer is restrained and it moves the hollow contact stem 127 and therewith the contact 126 into the bore 128 together with the trailer 144. The arc is then drawn and extinguished as the carriage 58 and the slab 57 continue to be moved toward the right. During all of this travel, the coil compression spring 113 is being expanded but the force capable of being exerted thereby is sufficient to maintain the intermediate contact 105 in contact engagement with the contact fingers 104 of the stationary contact 102. After the arc has been drawn and extinguished by separation of the contact 126 from the intermediate contact 105 in the manner described, the continued movement of the carriage 58 and slab 57 brings right end 151 of the insulating sleeve 107 into engagement with the annular shoulder 108 on the tubular insulating housing 106. Continued movement of the carriage 58 in the opening direction then moves the tubular insulating housing 106 and the intermediate contact 105 carried thereby away from the distal ends of the contact fingers 104 that form the stationary contact 102.

The movement of the carriage 58 and parts mounted thereon continues until the slabs 57 engage the rear side of the rear wall 80 of the metallic safety compartment 78 generally as shown by broken lines in FIGS. 5 and 6. In this position not only is there a substantial air gap between the upper and lower stationary line contacts 37 and 38 and the respective carriage contacts 55 and 56, but also there is a substantial air gap between the stationary contact 102 and the intermediate contact 105. In this open circuit position the right end of the tubular insulating housing 106 projects through the respective slot 81 in the plate 80 of the metallic safety compartment 78. Here, if necessary, the transverse pin 122 can be removed and the tubular insulating housing 106 and parts mounted thereon can be withdrawn for inspection, replacement, etc.

When the carriage 58 is moved toward the circuit closed position, the circuit is completed by engagement of the carriage contacts 55 and 56 with the respective upper and lower stationary line contacts 37 and 38. Thus, if the circuit is closed on a fault, the separable contact interrupter 100 is not injured by flow of heavy current. The continued movement of the carriage 58 toward the circuit closed position brings the intermediate contact 105 into engagement with the stationary contact 102 while the movable contact 126 remains in spaced relation to the intermediate contact 105 in the bore 128. Finally, the metallic plug 141, which previously had limited the opening movement of the contact 126 in the bore 128, acts through the head 138 and rod 139 to move the contact 126 into engagement with the intermediate contact 105, to compress the spring 130 to the position shown in FIG. 7 and to latch the trailer 144 by the latch fingers 148.

The design and construction of the separable contact interrupter 100 are such that it can be mounted in conjunction with the lower line contact 38 and the associated lower carriage contact 56. When so arranged, the circuit on opening is interrupted at two points so as to provide two gaps in series. This arrangement is shown diagrammatically in FIG. 13 where a second separable contact interrupter 100' is illustrated having a stationary contact 102' connected to the stationary lower line contact 38 and in engagement with an intermediate contact 105' that also engages a movable contact 126' in the circuit closed position.

In the event that only a single separable contact interrupter 100 is provided for each phase, then, as shown in FIGS. 6 and 9, auxiliary contact connecting means, indicated generally at 154, are provided for shunting the lower line contact 38 and the lower carriage contact 56 until after the circuit has been interrupted by the separable contact interrupter 100. The connecting means 153 comprises an auxiliary contact finger 154 that may be formed of resilient spring wire with a coiled intermediate section 155 to give increased flexibility. One end 156 of the auxiliary contact finger 154 is clamped to the lower carriage contact 56 while the distal end 157 is located in a notch 158 in an insulating guide 159 that is carried by the slab 57 on its rear side. In the circuit closed position the insulating guide 159 holds the distal end 157 of the auxiliary contact finger 154 out of contact engagement with the lower line contact 38. However, as soon as the slab 57 moves toward the open circuit position with the carriage 58 and before the lower carriage contact 56 disengages the lower line contact 38, the distal end 157 engages a metallic hook 160 that, as shown in FIG. 6, forms a part of an auxiliary contact 161 which is connected to and carried by the lower line contact 38. Accordingly, after the lower carriage contact 56 has disengaged the lower line contact 38, the circuit is transferred to the auxiliary contact 161 and metallic hook 160 to the distal end 157 of the contact finger 154. This contact is maintained until after the circuit has been interrupted by the separable contact interrupter 100. Just before the carriage 58 reaches its final open circuit position, the distal end 157 of the auxiliary contact finger 154 disengages the metallic hook 160 and is swung to a generally vertical position shown by broken lines in FIG. 6. An inclined guide surface 162 is provided on the metallic hook 160, FIG. 9, for engaging the distal end 157 of the contact finger 154 when the carriage 58 is moved to the circuit closed position for directing the distal end 157 into the notch 158 in the insulating guide 159 to the position shown in FIG. 9.

To conserve space and to reduce to a minimum the width of the metallic housing 11, the various contacts and separable contact interrupters are positioned as close together as the voltage of the system will permit. In order to prevent flashover between adjacent phases upper and lower insulating barriers 165 and 166 are employed as shown in FIGS. 4, 5 and 6. Two upper barriers 165 and two lower barriers 166 are employed for three phase operation. Side barriers can be provided between the outer phases and the adjacent grounded parts if the spacing is not sufficient for the particular circuit voltage. In order to prevent the flow of charging current to ground and resulting tracking over the surfaces of the interphase barriers 165 and 166 provision is made for mounting them on two of the respective stationary line contacts 37 and 38. The arrangement is illustrated in FIG. 10 where it will be observed that an angle bracket 167 is employed with one arm 168 mounted directly on the upper stationary line contact 37 while another arm 169 is secured by bolts 170 to the adjacent interphase barrier 165. Bosses 171 are formed integrally on the opposite side of barrier 165 to provide suitable insulation for the bolts 170 from the adjacent phase.

It is desirable to arrange for operating the carriage 58 with a snap action particularly from the circuit closed position. Also it is necessary to provide for applying sufficient force to compress the springs 113 and 130 in each of the separable contact interrupters 100 for maintaining the desired sequence of operation of the movable contact 126 and the intermediate contact 105 in the manner above described. Also it is necessary to provide sufficient force for overcoming whatever friction forces may be involved and for accelerating the carriage 58 and parts mounted thereon. For this purpose a snap acting operating mechanism indicated generally at 176 in FIGS. 1, 2, 4, 14, 15, 16 and 17 is provided. The snap operating mechanism 176 includes a manually rotatable handle 177 which is operated to the upper position shown in FIG. 1 when the carriage 58 is in the circuit closed position and is rotated to the lower position shown in FIG. 2 when the carriage 58 is in the open circuit position with the fuses 71 or other conducting means projecting through the vertical slots 81 in the rear wall 80 of the metallic safety compartment 78 and with the ends of the separable contact interrupters 100 projecting therethrough.

As shown in FIG. 5 the manually rotatable handle 177 is secured to one end of a shaft 178 that is journaled at its ends on a housing 179 which is secured by bolts 180 to the front wall 16 of the metallic housing 11. Also secured to and rotatable with the shaft 178 and with the manually rotatable handle 177 is a drive lever 181 one end 182 or the other end 183 of which is arrranged to engage one side or the other of an arm 184 that is secured to a hub 185 which is journaled for free rotation on the shaft 178. At the distal end the arm 184 is pivoted at 186 to a spring carrier 187. Extending from the spring carrier 187 is an inner spring guide tube 188 around which a coil compression spring 189 is positioned. One end of the coil compression spring 189 is arranged to react against a shoulder 190 on the spring carrier 187 while the other end is arranged to react against a shoulder 191 that is carried by an outer spring guide tube 192 which is telescoped over the inner spring guide tube 188 and has the coil compression spring 189 therearound. The outer spring guide tube 192 carries a transverse spring pivot pin 193 that is journaled at its ends in a generally U-shaped frame 194 which is secured to the housing 179 and forms a part thereof. The drive lever 181 is arranged on rotation of the manually rotatable handle 177 to rotate the arm 184 from one side of the center position of the coil compression spring 189 to the other for the purpose of moving the carriage 58 with a snap action in one direction or the other. The movement of the arm 184, as controlled by the coil compression spring 189 moving past the center position, is transferred through the hub 185 to a drive pawl 197 which is secured thereto and is angle shaped with the distal end 198 arranged to project through an arcuate slot 199 in a sprocket 200 that is journaled to rotate freely on the hub 185. The arcuate slot 199 provides the necessary lost motion between the drive pawl 197 and the sprocket 200 to permit rotation of the drive pawl for charging the spring 189. A chain 201 is trained over the sprocket 200 and also over a sprocket 202 that is secured to a transverse shaft 203 which is rotatably mounted near the rear of the metallic housing 11 adjacent its rear wall 13 by suitable bearings one of which is indicated at 204 in FIG. 15. Now it will be apparent that, depending upon the direction in which the manually rotatable handle 177 is rotated, the coil compression spring 189 is compressed to its center position and then, as it passes the center position, the energy stored therein is released to rotate the sprocket 200 in the corresponding direction to effect a corresponding rotation of the shaft 203.

The rotary movement of the shaft 203 is translated into translatory movement for operating the carriage 58 horizontally by means of drive arms 206, FIG. 4, which are secured to the shaft 203 to rotate therewith. They are also shown in FIGS. 16 and 17. At their distal ends the drive arms 206 are pivoted at 207, FIG. 5, to offset ends 208 of links 209 the other offset ends 210 of which are pivoted at 211 to ears 212 that extend upwardly from the channels 62 and 63 which are movably mounted along the stationary channels 64 and 65 in the manner previously described. In either direction of operation the rotation of the shaft 203 is limited by a stop arm 213 in cooperation with a stop 214 that is mounted stationarily on the rear wall 13, FIG. 4. The arrangement is shown schematically in FIG. 13 where one end 213a of the stop arm 213 has engaged the stop 214. For limiting the movement in the opposite direction the other end 213b of the stop arm 213 engages the other side of the stop 214.

As shown in FIG. 15 an interlocking cam 216 is mounted for rotation with the shaft 203. The cam 216 is constructed as described in the above identified Beebe et al. patent and is arranged to cooperate with a locking lever 217 which is pivoted at 218 on a wall 219 of the snap acting operating mechanism 176. The flexible wire 28 is connected at 220 to the locking lever 217 in order to provide the desired interlocking action between the pawl 26, FIG. 1, and the cam 216 in the manner described by the Beebe et al. patent. It will be understood that the arrangement is such that the door handle 22 cannot be operated to open the door 20 when the manually rotatable handle 177 occupies the position shown in FIG. 1 with the carriage 58 in the circuit closed position. It is only when the manually rotatable handle 177 has been rotated to the lower position shown in FIG. 2 that the pawl 26 is rotated to such position that the door handle 22 can be operated to unlatch the latch members 24 from the fixed latch members 25. When such operation is permitted, the carriage 58 is in the open circuit position with the slabs 57 overlying the vertical slots 81 in the rear wall 80 of the metallic safety compartment 78.

What is claimed as new is:
1. Switchgear comprising:
    a metallic housing,
    a pair of line contacts mounted in insulated spaced relation in said housing,
    a metallic safety compartment for said housing having an apertured wall opposite said line contacts,
    a carriage mounted for translatory movement in said housing between said line contacts and said compartment,
    a pair of carriage contacts on said carriage for engagement with and disengagement from said line contacts on movement of said carriage toward and away from said line contacts,
    an insulating slab carried by said carriage with said carriage contacts on one side and having contact clips on the opposite side connected respectively to said carriage contacts and arranged to project through the aperture in said wall of said safety compartment when said carriage is moved toward the same and said carriage contacts are separated from said line contacts,
    conductor means interconnecting said contact clips, and
    means on said housing for moving said carriage to separate said carriage contacts from said line contacts and to move said contact clips and said conductor means through said aperture into said compartment and vice versa.
2. Switchgear according to claim 1 wherein said conductor means includes fuse means.
3. Switchgear according to claim 1 wherein:
    separable contact circuit interrupter means is mounted on and is movable with said slab into said compartment through said aperture and includes one contact connected to one of said carriage contacts and another contact from which said one contact is separable for connection to the corresponding one of said line contacts when said line contacts are engaged by said carriage contacts, and
    means operated in response to movement of said carriage away from said line contacts for opening said separable contacts after separation of the respective carriage contact from its line contact.
4. Switchgear according to claim 3 wherein connecting means maintain the circuit between the other of said line contacts and its associated carriage contact until said circuit is interrupted by opening of the contacts of said circuit interrupter.
5. Switchgear according to claim 3 wherein:
    said metallic housing has walls with one wall including a door for closing off said compartment, and interlocking means between said carriage and said door prevent movement of said carriage by said carriage moving means unless said door is closed and prevent opening of said door unless said carriage has been moved away from said line contacts and said conductor means and said interrupter means have been moved into said compartment.

6. Switchgear according to claim 3 wherein:
said metallic housing has walls with one wall including a door for closing off said compartment, and
said door has a window aligned with said fuse means and said circuit interrupter means whereby they can be visually inspected without opening said door.

7. Switchgear according to claim 1 wherein said slab overlies and closes off said aperture in said wall when said carriage is moved away from said line contacts.

8. Switchgear according to claim 1 wherein:
means removably mount a part of said metallic safety compartment on said metallic housing, and
means removably mount said carriage and parts mounted thereon in said housing whereby, when said part of said metallic safety compartment is removed, bodily removal of said carriage and parts mounted thereon from said housing is facilitated.

9. Switchgear according to claim 1 wherein:
said metallic housing has walls with one wall including a door, and
interlocking means between said carriage and said door prevent movement of said carriage by said carriage moving means unless said door is closed.

10. Switchgear according to claim 9 wherein:
interlocking means between said carriage and said metallic housing prevent movement of said carriage toward said line contacts when said door is open, and
operating means between said door and the last mentioned interlocking means release the latter when said door is closed.

11. Switchgear according to claim 1 wherein said means for moving said carriage includes over center spring means that is movable to center position to store energy that is released to move said carriage with a snap action to engage or disengage said line contacts as the case may be.

12. Switchgear according to claim 1 wherein:
a plurality of pairs of said line contacts are provided together with a corresponding number of said carriage contacts on said cariage and said pairs of line contacts are mounted in said housing in insulated spaced relation,
interphase insulating barrier means are located between adjacent line contacts, and
means mount each insulating barrier means on one of the adjacent line contacts to prevent flow of charging current to ground on the respective insulating barrier means and thereby causing tracking over its surface.

13. Switchgear according to claim 1 wherein means are provided for connecting both of said carriage contacts to ground when said carriage is moved to open circuit position away from said line contacts.

14. Switchgear comprising:
a metallic housing,
a pair of line contacts mounted in insulated spaced relation in said housing,
a carriage mounted for translatory movement in said housing toward and away from said line contacts,
a pair of carriage contacts mounted on said carriage for engagement with and disengagement from said line contacts on movement of said carriage toward and away from said line contacts,
a fuse mounted on said carriage and interconnecting said carriage contacts,
a separable contact circuit interrupter mounted on said carriage and shunting one of said line contacts and the associated carriage contact at least during the initial separation of these contacts, and
means on said housing for moving said carriage to separate said carriage contacts from said line contacts and to open said contacts of said circuit interrupter and vice versa.

15. Switchgear according to claim 14 wherein:
said metallic housing has walls with one wall including a door, and
interlocking means between said carriage and said door prevent movement of said carriage by said carriage moving means unless said door is closed.

16. Switchgear according to claim 14 wherein connecting means maintain the circuit between the other of said line contacts and its associated carriage contact until said circuit is interrupted by opening of the contacts of said circuit interrupter.

17. Switchgear according to claim 14 wherein:
interlocking means between said carriage and said metallic housing prevent movement of said carriage toward said line contacts when said door is open, and
operating means between said door and the last mentioned interlocking means release the latter when said door is closed.

18. Switchgear according to claim 14 wherein:
a second separable contact circuit interrupter is mounted on said carriage and shunts the other of said line contacts and the associated carriage contact at least during the initial separation of these contacts, and
means operated by said carriage moving means open and close said contacts of said second separable contact circuit interrupter simultaneously with opening and closing of said contacts of the first mentioned separable contact circuit interrupter thereby providing two gaps in series between said line contacts during movement of said carriage away from said line contacts.

19. Switchgear according to claim 14 wherein:
ground contact means are mounted in said housing, and
conductor means on said carriage contacts engage said ground contact means after said carriage contacts have been separated from said line contacts.

20. Switchgear according to claim 19 wherein:
a metallic safety compartment is mounted in said housing and has an apertured wall opposite said line contacts through which said fuse and separable contact circuit interrupter are movable into said compartment when said carriage contacts are separated from said line contacts, and
said ground contact means are mounted on said metallic safety compartment.

21. Switchgear according to claim 14 wherein:
said separable contact circuit interrupter means includes a stationary contact connected to said one line contact, an intermediate contact separable from said stationary contact and movable with said circuit interrupter means and said carriage, a movable contact separable from said intermediate contact and between which an arc is drawn on movement of said carriage away from said line contacts, and spring means biasing said intermediate contact into engagement with said stationary contact, and
said means for moving said carriage includes over center spring means that is movable to center position to store energy that is released to move said carriage with a snap action to engage said line contacts against the biasing action of said spring means in said separable contact circuit interrupter means and to hold said intermediate contact in engagement with said stationary contact or to disengage said line contacts assisted by said biasing action as the case may be.

22. Electric circuit interrupter means comprising:
a stationary contact,
an intermediate contact engaging said stationary contact,
a movable contact engaging said intermediate contact and drawing an arc therebetween on separation thereof, operating means movable away from said stationary contact, an insulating housing movably mounted on said operating means, carrying said intermediate contact, and arranged to have said movable contact travel therein, first spring means reacting between said insulating housing and said operating means and biasing said intermediate contact to maintain engagement with said stationary contact, second spring means reacting between said operating means and said movable contact and biasing the latter away from said intermediate contact, and latch means restraining said movable contact until said operating means is moved a predetermined distance away from said stationary contact whereupon said latch means is unlatched and said movable contact disengages said intermediate contact and travels into said insulating housing, continued movement of said operating means to a predetermined distance further away from said stationary contact moving said insulating housing and thereby causing said intermediate contact to disengage said stationary contact.

23. Electric circuit interrupter means according to claim 22 wherein:
an insulating trailer is mounted on said movable contact to travel therewith into said insulating housing to confine the arc drawn between said intermediate contact and said movable contact between said insulating housing and said trailer, and
said latch means is mounted on said stationary contact and has latching engagement with said insulating trailer.

24. Electric circuit interrupter means according to claim 22 wherein:
a stationary main contact is connected to said stationary contact of said circuit interrupter means, and
a movable main contact engages said stationary main contact, is connected to said movable contact of said circuit interrupter means, and is mounted on said operating means for movement therewith to disengage said stationary main contact before said movable contact of said circuit interrupter means disengages said intermediate contact.

25. Electric circuit interrupter means according to claim 22 wherein:
the insulating housing is a tubular member carrying said intermediate contact at one end and having an annular slot extending from the other end for receiving a tubular extension of said operating means around which said first spring means is located,
a second tubular extension of said operating means is telescoped within said tubular member and is telescoped over a metallic tube carrying said movable contact at one end and having located therearound said second spring means,
said metallic tube has a shoulder engageable by said second tubular extension for unlatching said latch means,
said tubular member has a shoulder engageable by said operating means to disengage said intermediate terminal from said stationary terminal.

26. Electric circuit interrupter means comprising:
a stationary line contact,
a movable line contact for engaging and disengaging said stationary line contact,
means for translatorily moving said movable line contact into and out of engagement with said stationary line contact,
separable contact load current interrupter means shunting said line contacts during separation thereof and at least before they are separated,
means responsive to predetermined separation of said line contacts for opening the contacts of said load current interrupter, and
means mounting part of said load current interrupter means on said stationary line contact and another part for movement with said movable line contact.

27. Electric circuit interrupter means according to claim 26 wherein said load current interrupter includes:
a stationary contact connected to said stationary line contact,
a movable contact connected to said movable line contact,
an intermediate contact between said stationary and movable contacts of said load current interrupter means and in engagement therewith when said load current interrupter is in circuit closed position, and
means for maintaining said intermediate contact in engagement with said stationary contact while said movable contact is being separated therefrom to effect circuit interruption,
said intermediate contact thereafter being separated from said stationary contact to provide a gap therebetween.

28. Electric circuit interrupter means comprising:
a stationary interrupter contact,
an insulating housing movable away from said stationary interrupter contact,
an intermediate contact carried by said insulating housing and engaging said stationary interrupter contact,
a movable contact engaging said intermediate contact and movable into said housing,
operating means for moving said movable contact into said housing and separating it from said intermediate contact to draw and extinguish an arc and subsequently moving said housing to separate said intermediate contact from said stationary interrupter contact.

29. Electric circuit interrupter means according to claim 28 wherein:
a stationary main line contact is connected to said stationary interrupter contact,
a movable main line contact is connected to said stationary main line contact and to said movable contact, and
means separate said main line contacts before said movable arc drawing contact is separated from said intermediate contact.

30. Switchgear comprising:
a metallic housing,
a pair of line contacts mounted in insulated spaced relation in said housing,
a safety compartment for said housing having an apertured rear wall opposite said line contacts, upper, lower and side walls and open at the front,
a carriage mounted for translatory movement in said housing between said line contacts and said compartment,
a pair of carriage contacts on said carriage for engagement with and disengagement from said line contacts on movement of said carriage toward and away from said line contacts,
an insulating slab carried by said carriage with said carriage contacts on one side and having contact clips on the opposite side connected respectively to said carriage contacts and arranged to project through the aperture in said wall of said safety compartment when said carriage is moved toward the same and said carriage contacts are separated from said line contacts,
fuse means interconnecting said contact clips, and
means on said housing for moving said carriage to separate said carriage contacts from said line contacts to move said contact clips and said fuse means through said aperture into said compartment and to move said insulating slab to close off said aperture and vice versa, said line contacts being inaccessible through the front opening of said safety compartment when said insulating slab is positioned to close off said aperture in said rear wall of said safety compartment.

31. Switchgear according to claim 30 wherein:

separable contact circuit interrupter means is mounted on and is movable with said slab into said safety compartment through said aperture and includes one contact connected to one of said carriage contacts and another contact from which said one contact is separable for connection to the corresponding one of said line contacts when said line contacts are engaged by said carriage contacts, and means operated in response to movement of said carriage away from said line contacts for opening said separable contacts after separation of the respective carriage contact from its line contact.

32. Switchgear according to claim 30 wherein:

said metallic housing has walls with one wall including a grounded metallic door for closing off and preventing access to said safety compartment, and interlocking means between said carriage and said door prevent movement of said carriage by said carriage moving means unless said door is closed and prevent opening of said door unless said carriage has been moved away from said line contacts and said fuse means and said interrupter means have been moved away from said line contacts and said fuse means and said interrupter means have been moved into said safety compartment.

References Cited
UNITED STATES PATENTS

| | | | |
|---|---|---|---|
| 2,982,827 | 5/1961 | Goetz | 200—50 |
| 3,055,996 | 9/1962 | Beebe et al. | 200—169 X |

ROBERT K. SCHAEFFER, *Primary Examiner.*

J. R. SCOTT, *Assistant Examiner.*